United States Patent
Bucholtz

(10) Patent No.: US 6,244,577 B1
(45) Date of Patent: Jun. 12, 2001

(54) DOUBLE ACTING MECHANICAL SHOCK ABSORBER

(75) Inventor: Brian Charles Bucholtz, Lake View, NY (US)

(73) Assignee: Enidine Incorporated, Orchard Park, NY (US)

( * ) Notice: Subject to any disclaimer, the term of this patent is extended or adjusted under 35 U.S.C. 154(b) by 0 days.

(21) Appl. No.: 09/351,943

(22) Filed: Jul. 12, 1999

(51) Int. Cl.⁷ .................................................. F16F 7/00
(52) U.S. Cl. .................... 267/136; 267/196; 267/207; 267/134
(58) Field of Search .................... 267/196, 201, 267/205, 206, 207, 34, 221, 186, 190, 136, 204, 150, 134, 135; 188/129, 136; 52/167.4, 167.6, 167.3

(56) References Cited

U.S. PATENT DOCUMENTS

| | | | |
|---|---|---|---|
| Re. 19,931 | * | 4/1936 | Weymouth .......................... 267/64 |
| 1,560,477 | * | 11/1925 | Kessler . |
| 1,689,662 | * | 10/1928 | Bell et al. . |
| 3,059,727 | * | 10/1962 | Fuchs .......................... 188/1 |
| 3,437,332 | * | 4/1969 | Lee .......................... 267/1 |
| 3,735,952 | * | 5/1973 | Platus et al. .......................... 248/358 R |
| 3,796,288 | * | 3/1974 | Hollnagel .......................... 188/129 |
| 4,018,428 | * | 4/1977 | Weir .......................... 267/22 R |
| 4,194,582 | * | 3/1980 | Ostertag .......................... 175/321 |
| 4,428,565 | * | 1/1984 | Stiefel et al. .......................... 267/9 A |
| 4,736,931 | * | 4/1988 | Christopherson .......................... 267/8 R |
| 4,822,012 | * | 4/1989 | Sketo .......................... 267/221 |
| 5,257,680 | * | 11/1993 | Corcoran et al. .......................... 188/129 |
| 5,277,682 | * | 1/1994 | Chen .......................... 482/114 |
| 5,971,374 | * | 10/1999 | Freeman .......................... 267/134 |

FOREIGN PATENT DOCUMENTS

3302852 * 8/1984 (DE) .......................... 267/150

OTHER PUBLICATIONS

Ringfeder Friction Springs Deform Plus—Supplement to Ringfeder VBG GmbH Catalog Supplement Feb. 17, 1999.*

* cited by examiner

*Primary Examiner*—Douglas C. Butler
*Assistant Examiner*—Melody M. Burch
(74) *Attorney, Agent, or Firm*—Wall Marjama & Bilinski

(57) ABSTRACT

A double acting shock isolator that includes a cylindrical housing having a radially expanded chamber therein. The housing is closed at one end and open at the other end and a connector is mounted at the closed end. A stack of friction rings are mounted in a preloaded condition between the ends of the expanded chamber and a rod passes into the open end of the housing and through the stack. A pair of spaced apart raised flanges are mounted upon the rod that engages either end of the stack. A second connector is mounted upon the distal end of the rod outside of the housing so that the stack of friction rings is further compressed uniformly when either a tensile force or a compressive force is applied to the connectors.

4 Claims, 3 Drawing Sheets

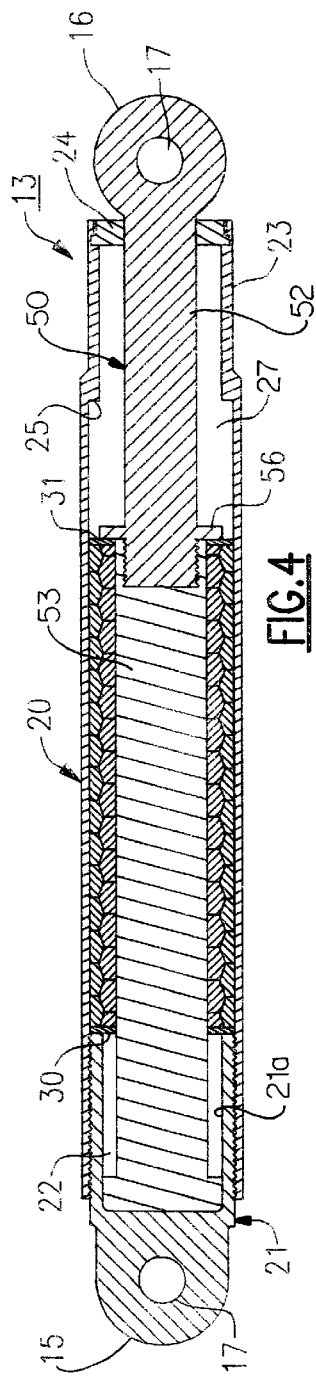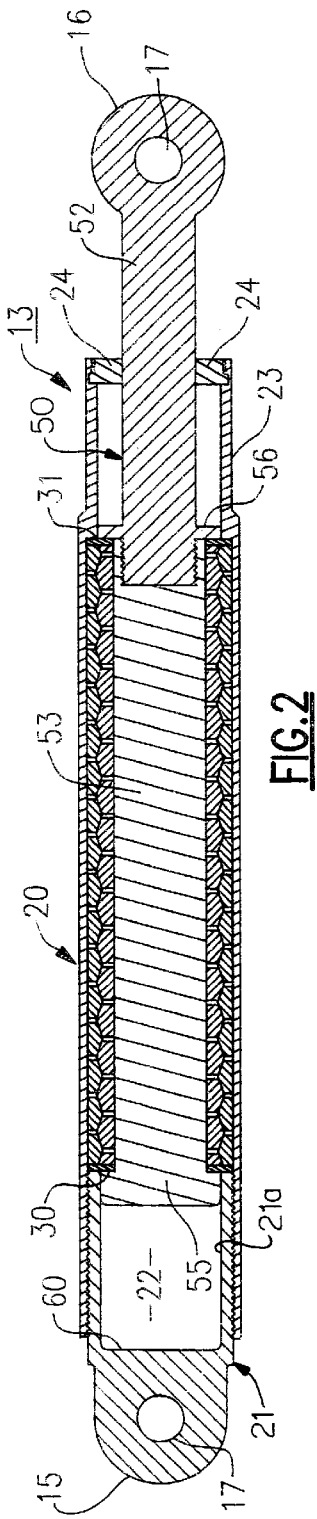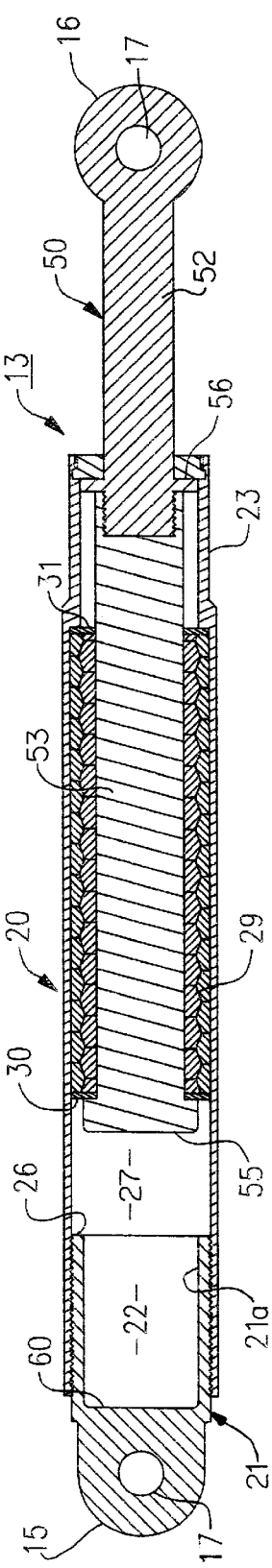

DOUBLE ACTING MECHANICAL SHOCK ABSORBER

BACKGROUND OF THE INVENTION

This invention relates to a double acting shock isolator and in particular, to a double acting shock isolator that relies upon mechanical components to isolate a body from multi-directional forces.

Many types of equipment such as computers and the like, can be exposed to outside forces, such as earthquakes which can adversely effect the operation of the equipment. Shock absorbing devices have been devised to isolate this type of equipment from vibratory forces, however, for the most part these isolators relied on liquid spring technology to attain the desired results. Liquid springs do not exhibit long life because the fluids employed can break down over a period of time and are generally adversely effected by temperature. In addition, liquid springs require the use of seals which degrade and develop leaks over a period of time again reducing the usual life of the isolator. Liquid spring devices, thus do not lend themselves to applications where the isolator is required to operate for a long period of time, maintenance free in a remote location.

Although mechanical spring devices have been used for some time to isolate various types of equipment, the response of most of these springs are unidirectional and thus generally do not lend themselves to double acting applications where the spring is required to react uniformly to both compressive and tensile forces.

SUMMARY OF THE INVENTION

It is, therefore, an object of the present invention to improve shock isolators and, in particular, double acting shock isolators.

A further object of the present invention is to provide a double acting shock isolator that exhibits long life.

A still further object of the present invention is to provide a mechanical double acting shock isolator that is relatively insensitive to temperature changes.

Another object of the present invention is to provide a mechanical double acting shock isolator that exhibits a uniform response to both tensile and compressive forces.

Yet another object of the present invention is to eliminate the use of a hydraulic component from a double acting shock isolator.

These and other objects of the present invention are attained by a double acting mechanical shock isolator that includes a cylindrical housing that is closed at one end and opened at the other end and which contains a radially expanded inner chamber. A stack of friction rings are mounted between the end walls of the expanded chamber in a preload condition. An actuating rod enters the housing through the open end and is arranged to pass through the stack of friction rings. Raised spaced apart flanges are mounted upon the actuator rods and are arranged to seat against both ends of the stack when the stack is preloaded between the end walls of the expanded chamber. A first connector is mounted upon the housing at its closed end while a second connector is mounted upon the distal end of the actuator rod outside of the housing. Applying either a tensile or compressive load to the connectors will cause the friction spring stack to further compress, thus absorbing the energy of the applied load through the interaction of the friction rings and the stress energy will return the spring and thus the isolator to a neutral position when the externally applied load returns to zero.

BRIEF DESCRIPTION OF THE DRAWINGS

For a better understanding of these and other objects of the present invention, reference can be made to the following detailed description of the invention that is to be read in association with the accompanying drawings wherein:

FIG. 2 is Enlarged side elevation in section showing the double acting shock isolator of the present invention in a neutral position;

FIG. 3 is a side elevation similar to FIG. 2 showing the reaction of the shock isolator under a compressive load;

FIG. 4 is a side elevation similar to FIG. 2 showing the reaction of the shock isolator under a tensile load;

DESCRIPTION OF THE INVENTION

Figure 1:
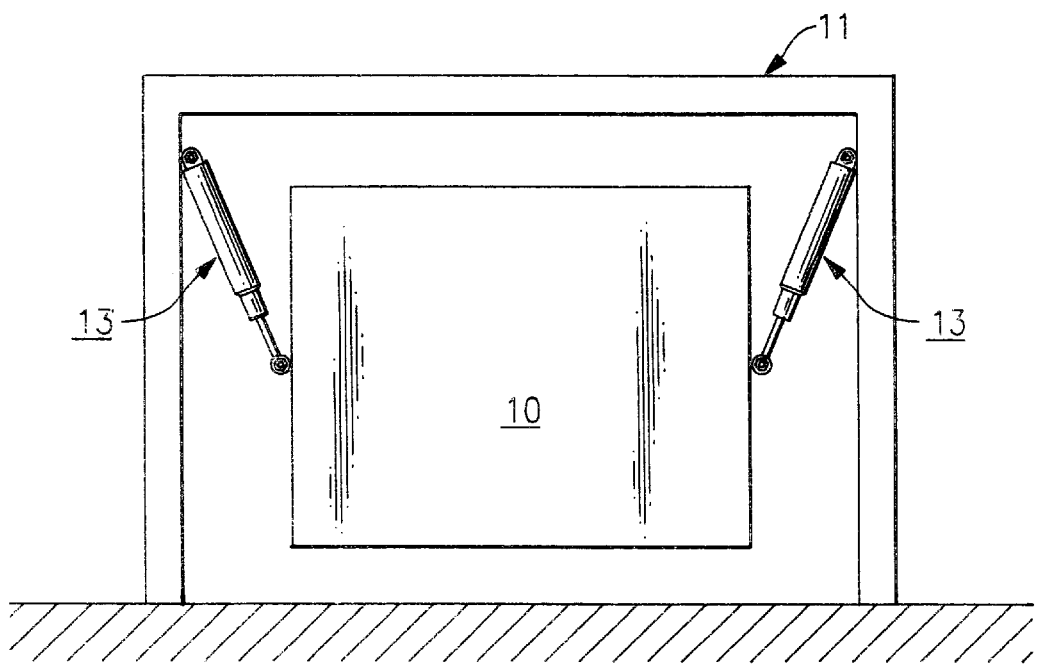
FIG. 1 is a schematic representation showing a mass supported by the apparatus of the present invention.

Turning now to FIG. 1, there is shown an instrument generally referenced 10 that is mounted within a structure 11 that is located in a remote location where it will be exposed seismic disturbances that can transmit harmful vibrations to the instrument. The instrument is suspended from the structure by a pair of double acting shock isolators 13 that embody the teachings of the subject invention.

Turning now to FIGS. 2–4, there is shown in greater detail the double acting isolator 13 embodying the teachings of the present invention. FIG. 2 illustrates the isolator in a neutral position at which time the isolator is not experiencing an external load between the two end connectors 15 and 16. FIG. 3 illustrates the isolator in an extended position when a maximum allowable tensile force is applied to the two connectors. FIG. 4 further illustrates the present isolator in a compressed position when a maximum allowable compressive load is applied to the connector. Each of the connectors contain a hole 17 that permits the two ends of the isolator to be coupled between bodies.

The isolator 13 further includes a cylindrical housing 20 that is closed at one end by end wall 21 that is integral with connector 15. The end wall contains a tubular section 23 that is threaded into the proximal end of the housing to a desired depth and staked in place to maintain this depth. The tubular section of end wall of the connector further contains a blind hole 22, the purpose of which will be explained in greater detail below. The opposite end of the housing contains a necked down section 23 that terminates with an annular end wall 24 that opens the interior of the housing to the surrounding ambient. The interior portion of the necked down section of the housing terminates in a radially extended shoulder 25 (FIG. 4). The shoulder 25 is positioned in the housing directly opposite a second shoulder 26 (FIG. 3) of equal depth that is formed by the proximal end of the closure section 21. In assembly, the two opposed radially disposed shoulders define an expanded chamber 27 centrally located within the housing.

A stack 29 of friction rings are mounted within the expanded chamber between the two shoulders. The stack will be herein referred to as a friction spring. Annular retaining rings 30 and 31 are mounted at each end of the stack and are interposed between the last friction ring in the stack and the adjacent shoulder.

Figure 6:
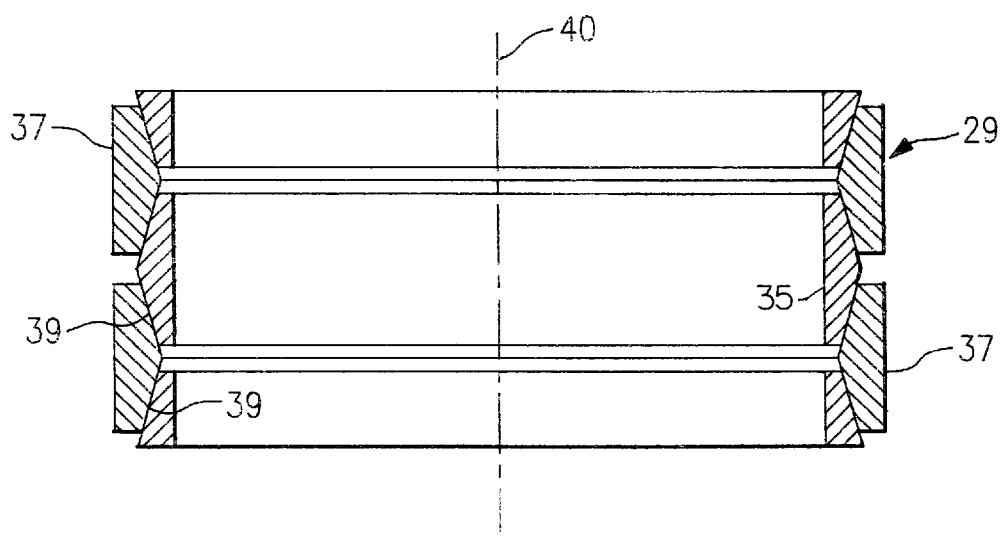
FIG. 6 is a partial sectional view showing a series of friction rings mounted to gather in assembly.

FIG. 6 is an enlarged section through the friction spring showing in greater detail the stack arrangement. The spring consists of a plurality of individual inner rings 35 and outer rings 37 that contain contoured opposing V-shaped faces wherein each side of the V forms a wedge surface 39 that is angularly offsets with regard to the axial center line 40 of the spring. As illustrated in FIG. 6, the wedge surfaces on one outer ring are adapted to ride in friction contact with wedge surfaces on the two adjacent inner rings. Upon the application of an axial force (F) the action of the wedge faces expands the outer rings and contracts the inner rings radially, thus allowing for axial deflection. As a result, the friction spring has a uniform stress distribution with the tensile stresses being absorbed in the outer rings and the compressive stress being absorbed in the inner rings.

In assembly, the friction spring is mounted between the shoulders of the expanded chamber in a compressed preloaded condition so that when the isolator is in the neutral position as exhibited in FIG. 2, the spring continually exerts a holding force against the shoulders. Friction spring of the type herein described are commercially available through Ringfeder Corporation of Westwood, N.J.

A shaft, generally referenced 50, is passed into the open distal end of the housing and through the friction ring stack. Connector 16, as noted above, is integrally joined to the outer distal end of the shaft. The stem 52 of the rod is removably joined by any suitable means such 25 as screw threads to an elongated shank section 53. The terminal end of the shank section contains a radially expanded first flange 55 that is capable of riding in sliding contact against the inside wall of the blind hole 22 formed in the tubular section 21 of the end wall 21. The flange extends radially a sufficient distance so that it can contact the outside surface of the retainer ring 30.

A second flange 56 is also mounted on the stem section of the rod. The second flange is spaced apart from the first flange an axial distance that is equal to the axial distance separating the two opposed shoulders of the expanded chamber. Here again, the flange extends radially so that it is capable of contacting the outside of retaining ring 31. Accordingly, when the isolator is in the neutral position as illustrated in FIG. 2, the friction spring is captured in a preload position between the two flanges and the shoulders of the expanded chamber.

Turning now to FIG. 3, the isolator is shown experiencing a full tensile load. As can be seen, the rod at this time is fully extended to the right as viewed. This extension of the rod causes the flange 55 to further compress the friction spring against the shoulder 25 of the expanded chamber. Further compression of the spring which cause the spring to absorb energy which is dissipated to the surrounding ambient as heat. When a maximum tensile load is reached, the flange 56 of the rod bottoms against the end wall 24 of the housing.

FIG. 4 illustrates the isolator under a full compressive load. In this condition, the rod has moved into the housing and the second flange 56 has engaged the retaining ring 31 and again compresses the friction ring in the opposite direction. At this time, the flange 55 enters the blind hole 22 in the closure section 21 and bottoms against the bottom wall 60 of the blind hole. Here again, the spring absorbs energy which is stored internally and dissipated as heat to the surrounding ambient.

Figure 5:
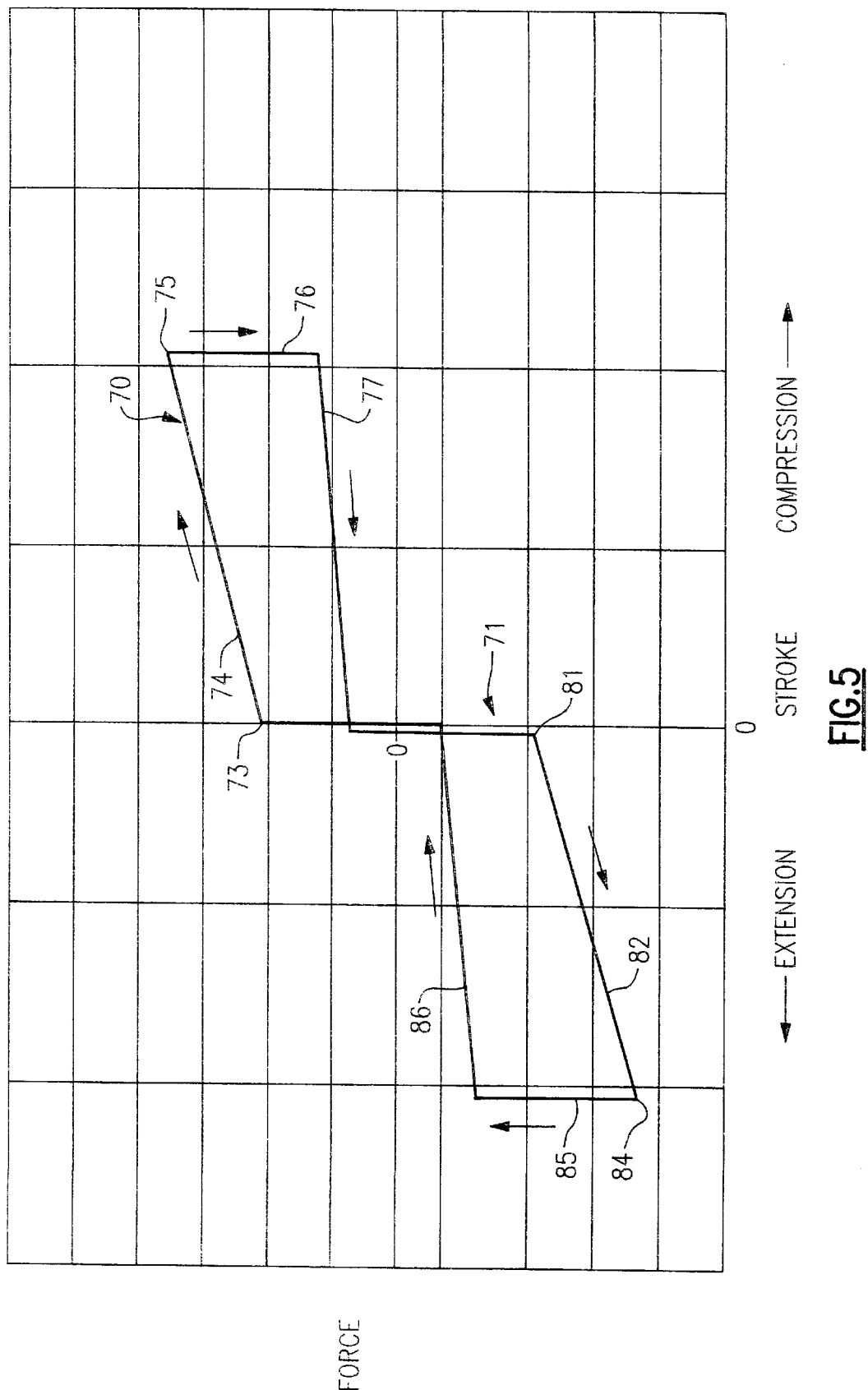
FIG. 5 s a load deflection curve illustrating the response of the present shock isolator.

The response of the friction spring is shown in FIG. 5 wherein the displacement of the spring is plotted against the force exerted upon the isolator. The force displacement curve 70 depicts the performance response of the friction spring when the isolator is placed under tension while the force displacement 71 depicts the performance response of the friction spring when the isolator is placed under compression. When in the neutral position shown in FIG. 2, the displacement of the spring is at the zero position. Application of a compressive load to the isolator initially does not further displace the spring as it initially begins to absorb energy internally. At a given force at point 73, the spring begins to compress along line 74 until maximum compression is reached at point 75. Upon release of the tensile load on the isolator, the spring gives up its stored internal energy along lines 76 and 77 before returning to the neutral starting point along the zero displacement axis.

Curve 71 shows the response of the friction spring when the isolator is placed under a maximum tensile load. Here again, the spring initially absorbs internally energy along the zero displacement axis. The spring then begins to deflect at point 81 and continues to compress along line 82 until maximum compression is reached at point 84. Upon release of the compression force upon the isolator, the spring returns to the neutral position along lines 85, 86 and the zero axis.

As can be seen by a comparison of curves 70 and 71, the reaction of the spring in either direction is substantially the same. Accordingly, the isolator will respond uniformly to both tensile and compressive loads.

It should be evident from the disclosure above that the present isolator operates solely upon mechanical principals and, as such, is not subjected to the problems associated with fluid springs. Accordingly, the present isolator can be used with reliability in remote locations for long periods of time without the need of periodic maintenance required by other prior art devices.

While this invention has been explained with reference to the structure disclosed herein, it is not confined to the details set forth and this invention is intended to cover any modifications and changes as may come within the scope of the following claims:

What is claimed is:

1. A double acting mechanical shock absorber that includes:

a cylindrical housing having a distal end and a proximal end, said housing containing a first axially disposed bore passing inwardly through said proximal end and a second axially disposed bore passing inwardly through said distal end, said first axially disposed bore having a larger diameter than said second axially disposed bore so that a first radially disposed shoulder is provided within the housing at the distal end thereof, a proximal end wall that is joined to the housing for closing the proximal end of said housing, said end wall further including a tubular section that extends inwardly from the end wall into said housing a predetermined distance, said tubular section having an end face to provide a second radially disposed stop shoulder at the distal end of said tubular section within said housing opposite said first radially disposed shoulder wherein a radially expanded chamber is established between the shoulders within said housing, a stack of friction rings mounted within said chamber between the shoulders, a shaft extending into the housing through said distal end of said housing that passes through said stack into said tubular section of said end wall, said shaft containing a first radially extended flange for engaging one end of said stack and a second radially extended flange for engaging the opposite end of said stack so that the stack is compressed between one of the flanges and one of the shoulders as the shaft moves axially within said housing.

2. The double acting mechanical shock absorber of claim 1 wherein said first radially extended flange is slidably contained within said second axially disposed bore and said second radially extended flange is slidably contained within said tubular section of the end wall.

3. The double acting mechanical shock absorber of claim 1 wherein said shaft includes a stem section containing said first radially extended flange and an elongated shank section that contains said second radially extended flange, said stem section being threadably joined to said shank section.

4. The double acting mechanical shock absorber of claim 1 wherein said tubular section of said end wall is threadably joined to the housing.

* * * * *